United States Patent
Mohrlock

(10) Patent No.: US 9,902,226 B2
(45) Date of Patent: Feb. 27, 2018

(54) WHEEL SUSPENSION OF A VEHICLE AXLE

(71) Applicant: AUDI AG, Ingolstadt (DE)

(72) Inventor: Dominik Mohrlock, Buxheim (DE)

(73) Assignee: AUDI AG, Ingolstadt (DE)

( * ) Notice: Subject to any disclaimer, the term of this patent is extended or adjusted under 35 U.S.C. 154(b) by 5 days.

(21) Appl. No.: 15/211,147

(22) Filed: Jul. 15, 2016

(65) Prior Publication Data
US 2017/0015359 A1 Jan. 19, 2017

(30) Foreign Application Priority Data
Jul. 18, 2015 (DE) .......................... 10 2015 009 306

(51) Int. Cl.
*B60G 7/00* (2006.01)
*B60G 3/20* (2006.01)
*B60G 7/04* (2006.01)

(52) U.S. Cl.
CPC .............. *B60G 7/001* (2013.01); *B60G 3/20* (2013.01); *B60G 7/04* (2013.01);
(Continued)

(58) Field of Classification Search
CPC . B60G 7/001; B60G 7/04; B60G 3/20; B60G 2206/11; B60G 2200/156;
(Continued)

(56) References Cited

U.S. PATENT DOCUMENTS 3,674,285 A * 7/1972 Grosseau ............... B60G 7/008
267/258
4,181,322 A * 1/1980 Kroniger ................. B60G 3/26
267/228

(Continued)

FOREIGN PATENT DOCUMENTS

DE 60211255 T2 9/2006
DE 102013016767 A1 8/2014
(Continued)

OTHER PUBLICATIONS

Dominik Morhlock et al., U.S. Pat No. 8,925,945, 2014-0239608, Aug. 28, 2014.
(Continued)

*Primary Examiner* — Darlene P Condra
(74) *Attorney, Agent, or Firm* — Henry M. Feieresien LLC

(57) ABSTRACT

A wheel suspension for a vehicle axle, in particular a front axle, of a two-track vehicle includes a wheel carrier configured to support a vehicle wheel, and a link assembly configured to articulate the wheel carrier to a vehicle body. The link assembly includes at least one two-point link articulated on a side of the wheel carrier to the wheel carrier at a first mounting point and on a side of the vehicle body to the vehicle body at a second mounting point. The two-point link executes a pivotal movement in the event of a head-on collision to enable a collision-proximal vehicle wheel to move backwards. The two-point link includes a stop member to limit the pivotal movement in the event of the head-on collision, by impacting a body-side counter-piece, thereby forming a body-side third mounting point to block and counteract the pivotal movement of the two-point link.

19 Claims, 5 Drawing Sheets

(52) U.S. Cl.
CPC .. *B60G 2200/154* (2013.01); *B60G 2200/156* (2013.01); *B60G 2204/143* (2013.01); *B60G 2204/41* (2013.01); *B60G 2204/423* (2013.01); *B60G 2204/45* (2013.01); *B60G 2206/016* (2013.01); *B60G 2206/11* (2013.01)

(58) Field of Classification Search
CPC .......... B60G 2204/45; B60G 2200/154; B60G 2204/423; B60G 2204/41; B60G 2206/016; B60G 2204/143
See application file for complete search history.

(56) References Cited

U.S. PATENT DOCUMENTS

| | | | | |
|---|---|---|---|---|
| 4,334,693 A | * | 6/1982 | Huber | B60G 3/28 280/124.143 |
| 5,597,171 A | * | 1/1997 | Lee | B60G 3/20 280/124.138 |
| 9,545,827 B2 | * | 1/2017 | Goldberg | B60G 3/20 |
| 2002/0008375 A1 | * | 1/2002 | Iyanagi | B62D 21/152 280/784 |
| 2003/0141712 A1 | | 7/2003 | Miyasaka | |
| 2005/0275181 A1 | * | 12/2005 | MacIsaac | B60G 3/01 280/124.103 |
| 2009/0066049 A1 | * | 3/2009 | Kunert | B60G 3/265 280/124.134 |
| 2011/0025012 A1 | * | 2/2011 | Nakamura | B60G 3/20 280/124.135 |
| 2015/0102592 A1 | * | 4/2015 | Kerstan | B60B 35/00 280/784 |
| 2015/0166115 A1 | * | 6/2015 | Kim | B62D 25/082 280/124.134 |
| 2016/0236529 A1 | * | 8/2016 | Sakaguchi | B60G 7/001 |
| 2017/0182875 A1 | * | 6/2017 | Scharf | B60K 5/1241 |

FOREIGN PATENT DOCUMENTS

| | | |
|---|---|---|
| JP | S64-44309 A | 2/1989 |
| WO | WO2015/044753 A1 | 4/2015 |

OTHER PUBLICATIONS

Dominik Mohrlock et al., U.S. Pat No. 9,108,482, 2014-0232083-A1, Aug. 21, 2014.
Dominik Mohrlock et al., U.S. Pat No. 9,205,874, US2014-0319787A1, Oct. 30, 2014.
Dominik Mohrlock et al., U.S. Pat No. 6,067,670, 2014-0217782, Aug. 7, 2014.
Dominik Mohrlock et al., U.S. Pat No. 9,096,273, 2015-0076866-A1, Mar. 19, 2015.

* cited by examiner

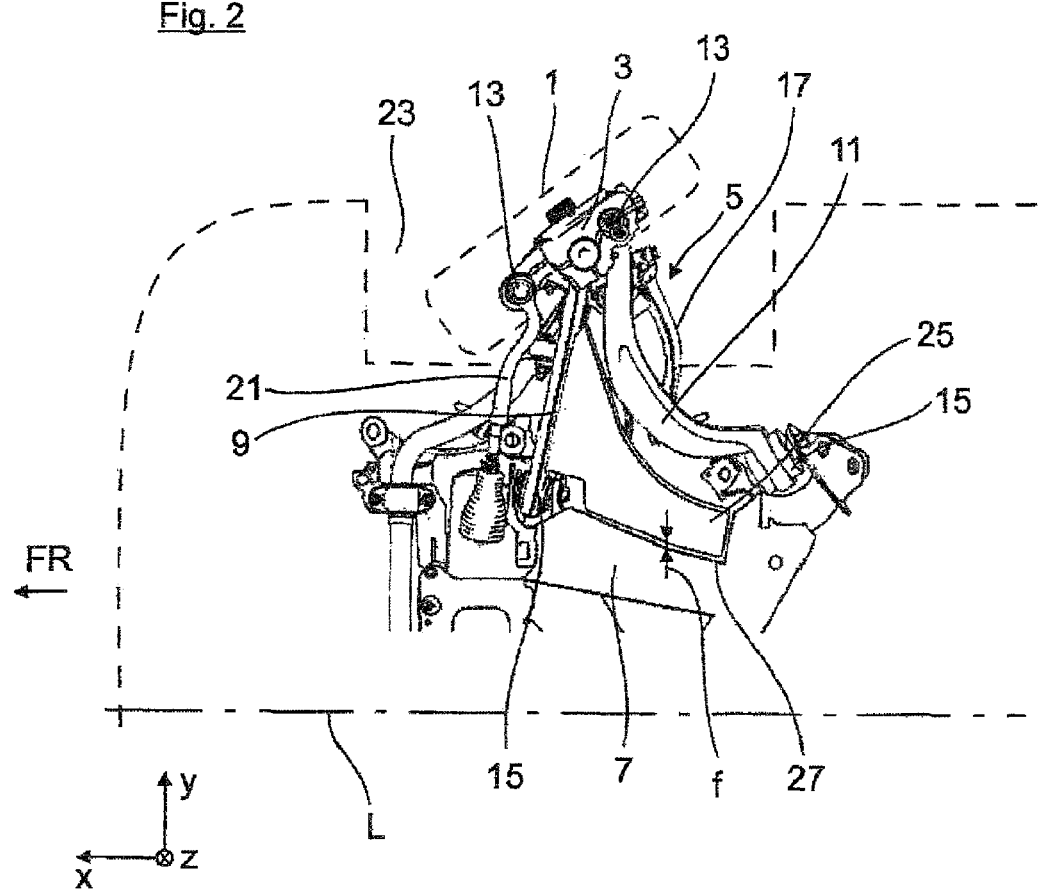

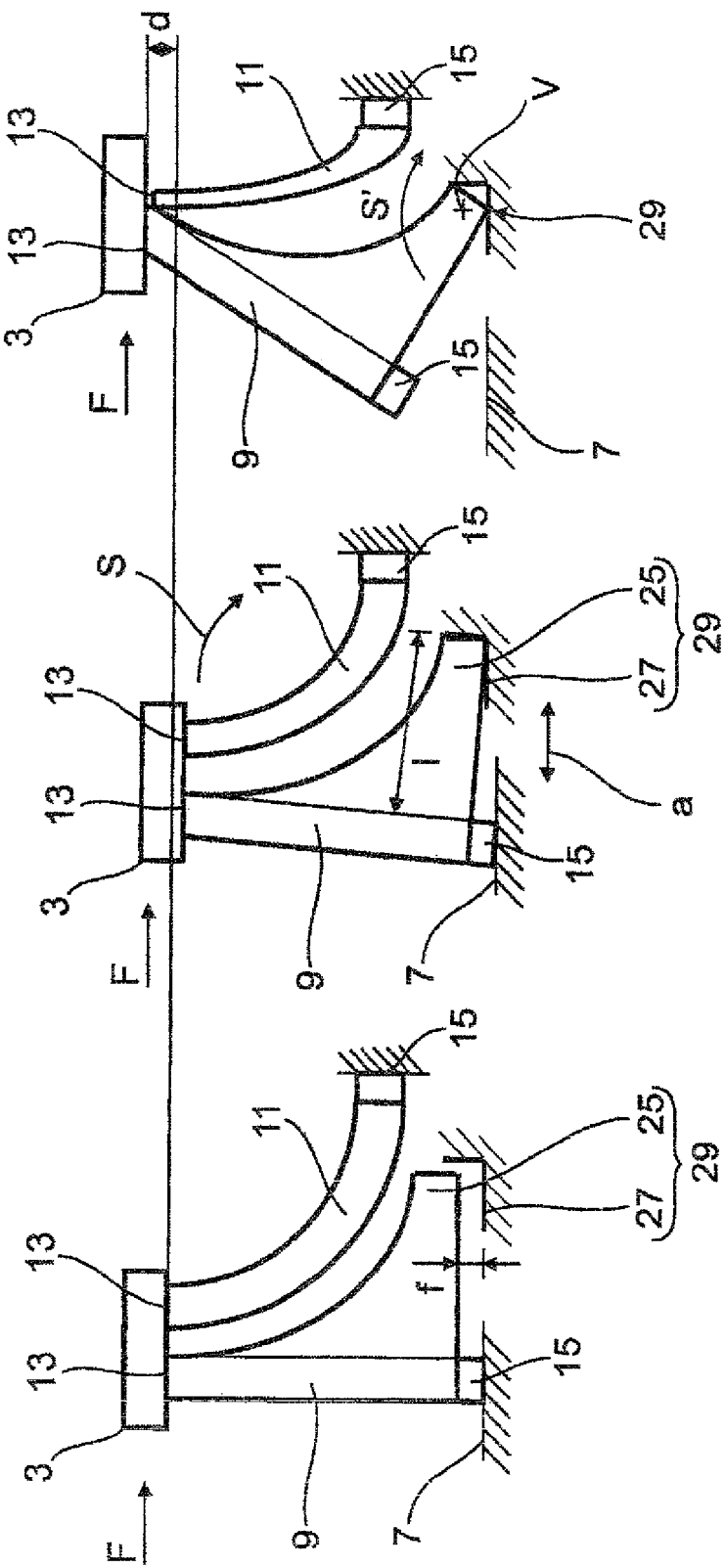

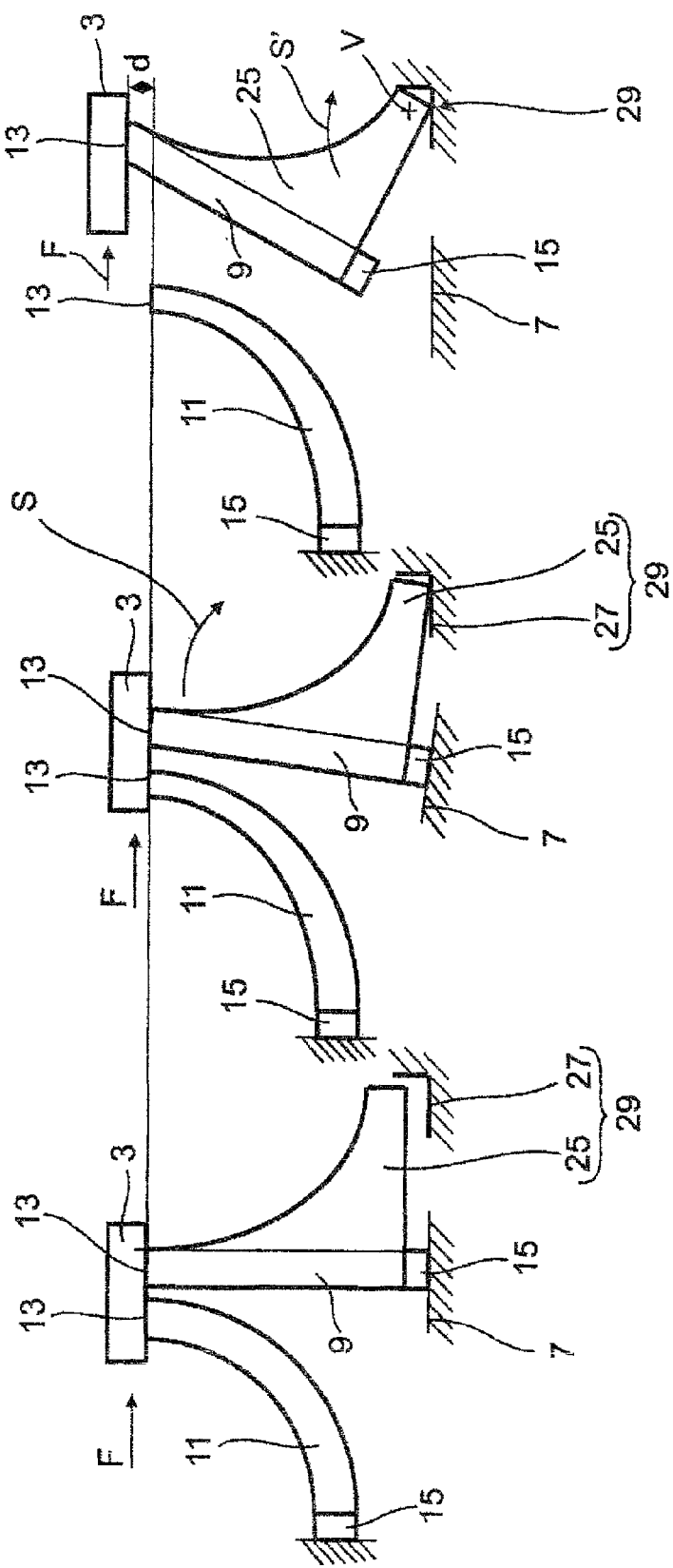

WHEEL SUSPENSION OF A VEHICLE AXLE

CROSS-REFERENCES TO RELATED APPLICATIONS

This application claims the priority of German Patent Application, Serial No. 10 2015 009 306.1, filed Jul. 18, 2015, pursuant to 35 U.S.C. 119(a)-(d), the disclosure of which is incorporated herein by reference in its entirety as if fully set forth herein.

BACKGROUND OF THE INVENTION

The present invention relates to a wheel suspension for a vehicle axle of a two-track vehicle.

The following discussion of related art is provided to assist the reader in understanding the advantages of the invention, and is not to be construed as an admission that this related art is prior art to this invention.

In a so-called small overlap crash test, the collision with a barrier occurs with little lateral overlap. The impact forces are thus introduced in the vehicle transverse direction at least partly outside the front-side cross member of the vehicle directly into the crash-proximal front wheel. The rim of the front wheel is shifted in the vehicle longitudinal direction rearwards in the direction of the footwell of the passenger compartment, so that there is a risk of intrusion into the footwell.

It would be desirable and advantageous to provide an improved wheel suspension for a vehicle axle to obviate prior art shortcomings.

SUMMARY OF THE INVENTION

According to one aspect of the present invention, a wheel suspension for a vehicle axle of a two-track vehicle includes a wheel carrier configured to support a vehicle wheel, and a link assembly configured to articulate the wheel carrier to a vehicle body, the link assembly including at least one two-point link articulated on a side of the wheel carrier to the wheel carrier at a first mounting point and on a side of the vehicle body to the vehicle body at a second mounting point, with the two-point link executing a pivotal movement in the event of a head-on collision to enable a collision-proximal vehicle wheel to move backwards, the two-point link including a stop member to limit the pivotal movement in the event of the head-on collision, by impacting a body-side counterpiece, thereby forming a body-side third mounting point to block and counteract the pivotal movement of the two-point link.

In the event of a collision, the crash-proximal vehicle wheel is shifted backwards in the vehicle longitudinal direction, causing the two-point link to pivot about its body-side second mounting point. In accordance with the present invention, this pivotal movement of the two-point link is now limited by the presence of the stop member which impacts a body-side counterpiece during the collision. This results in a blockage that counteracts the pivotal movement of the two-point link and thus reduces the risk of intrusion into the footwell of the passenger compartment.

The stop member formed on the two-point link is suitably only effective in the event of a collision, as mentioned above, i.e. ineffective during normal driving mode, e.g. steering operations. Thus, according to another advantageous feature of the present invention, during normal driving mode, the stop member of the two-point link is spaced from the counterpiece by a clearance.

The third mounting point is formed as a result of the collision between the stop member and the body-side counterpiece, and defines an additional force path via which impact forces can be introduced into the vehicle body. In a crash, the two-point link thus acts as a three-point link with the addition of the third mounting point.

According to another advantageous feature of the present invention, the third mounting point formed as a result of the collision can be arranged, as viewed in a vehicle longitudinal direction, on a collision-distal side of the two-point link. The stop member may hereby extend from the two-point link by a predefined length. In such a construction, the third mounting point, formed as a result of the collision, can be arranged, as viewed in a vehicle longitudinal direction, at a distance behind the second mounting point of the two-point link. The third mounting point is thus exposed at all times to compressive forces which are introduced via the third mounting point in the vehicle transverse direction into the vehicle body.

According to another advantageous feature of the present invention, the second mounting point of the two-point link can be dimensioned to rupture during the collision to enable the two-point link to pivot about a vertical axis defined by the third mounting point and execute a pivotal movement, thereby causing a transverse shift of the vehicle wheel in a vehicle transverse direction outwards. The two-point link is thus decoupled at the second mounting point from the vehicle body so that the two-point link is able to pivot during the course of the crash bout the vertical axis defined by the third mounting point. Thus, the pivotal movement along a circular path results in a beneficial transverse shift of the vehicle wheel outwards in the vehicle transverse direction to enhance the safety for vehicle occupants.

The stop member of the two-point link may be configured, for example, as a rigid strut and/or large-area shear section. In terms of operational safety, implementation of a smooth and correctly positioned pivotal movement of the two-point link with attached stop member is desirable. Such a precise positioning of the pivotal movement can be realized by a longitudinal guide which is secured to the vehicle body and precisely guides the stop member of the two-point link, when the two-point link pivots about the second mounting point during normal operation or during a crash. Thus, the pivotal movement can be reliably guided to contact the body-side counterpiece in the event of a crash.

According to another advantageous feature of the present invention, the longitudinal guide can be configured in the form of a coupling rod which is articulated to both the two-point link and the vehicle body. As an alternative, the longitudinal guide can be configured in the form of a rubber bearing, e.g. a rubber-metal bearing, which connects the stop member of the two-point link to the vehicle body in the vehicle vertical direction. Advantageously, the rubber bearing has in the vehicle vertical direction a rigidity which is greater than a rigidity of the rubber bearing in a direction transversely to the vehicle vertical direction to thereby realize a smooth pivotal movement of the two-point link about the second mounting point.

According to another advantageous feature of the present invention, the link assembly can be a five-link assembly of which the two-point link is part of and which may include, for example, two links arranged in an upper link plane, two links arranged in a lower link plane, and a track rod. The two-point link may in this case represent a transverse link, which together with a longitudinal link of the link assembly is arranged in a lower link plane or also upper link plane.

The thus installed two-point link may hereby assume a load-bearing function to support a suspension spring and a vibration damper.

According to another advantageous feature of the present invention, the longitudinal link, disposed in the lower link plane, can be arranged in the vehicle longitudinal direction on a collision-proximal side of the two-point link to assume a function as a tension strut which is subjected to a tensile force in the event of the collision. The wheel-carrier-side mounting point of the longitudinal link can hereby be configured to rupture, like the second mounting point on the body side, during the course of the crash. As a result, the longitudinal link and the two-point link are decoupled, so that the two-point link together with the wheel carrier can pivot about the vertical axis defined by the third mounting point, as described above.

According to another advantageous feature of the present invention, the longitudinal link can also be arranged in the lower link plane on the collision-distal side of the two-point link to assume a function as a compression strut which is subjected to a compressive force in the event of the collision and via which collision forces can be introduced into the vehicle body in the vehicle transverse direction.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a partial bottom view of the wheel suspension of FIG. 1 during normal operating mode with turned wheel;

FIGS. 3 to 5 show various views of the wheel suspension during the course of a crash with respect to a lower link plane, depicting arrangement of a longitudinal link on a crash-distal side of a two-point link;

FIGS. 6-8 show various views of the wheel suspension during the course of a crash with respect to a lower link plane, depicting arrangement of a longitudinal link on a crash-proximal side of a two-point link;

DETAILED DESCRIPTION OF PREFERRED EMBODIMENTS

Figure 1:
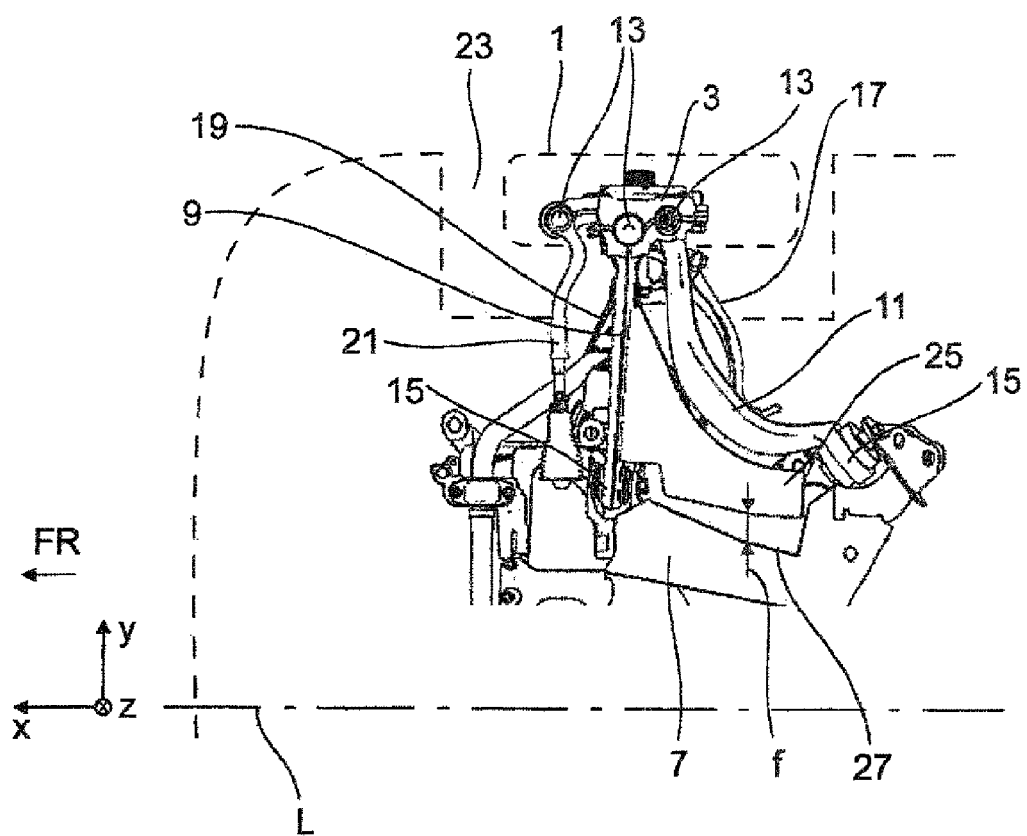
FIG. 1 is a partial bottom view of a wheel suspension according to the present invention, by way of example on a front axle, depicting by dashed line a vehicle outer contour.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a partial bottom view of a wheel suspension according to the present invention, by way of example on a front axle, for steered front wheels 1 of a two-track motor vehicle. The wheel suspension is installed in relation to a vehicle longitudinal axis L as mirror image also on the opposite side in the front axle.

As is apparent from FIG. 1, the wheel suspension includes a wheel carrier 3 to support a front wheel 1. The wheel carrier 3 is attached via a link assembly to a subframe associated to a vehicle body 7. By way of example, the link assembly shown here includes a total of five links. In a lower link plane, there are a front transverse link 9 in the form of a two-point link, and a longitudinal link 11 which trails the transverse link 9 in a vehicle longitudinal direction x. The transverse link 9 and the longitudinal link 11 are articulated at wheel-carrier-side first mounting points 13 to the wheel carrier 3 and at body-side second mounting points 15 to the subframe 7. In addition, the link assembly includes in an upper link plane thereof upper links 17, 19 and a track rod 21 which is coupled to a steering gear and connected to the wheel carrier 3 at a wheel-carrier-side mounting point 13.

The front wheel 1 is shown in FIG. 1 in a straight disposition, i.e. not turned, and positioned in a body-side wheelhouse 23, which is only hinted here.

As is further apparent from FIG. 1, the two-point link 9 is provided with a large-area stop member 25 which forms a shear area. The stop member 25 effects a limitation of a crash-caused pivotal movement S (FIGS. 4 and 7) of the two-point link 9, as will be described further below. The stop member 25 is integrated on the two-point link 9 and extends within a space between the transverse link 9 and the longitudinal link 11. In the event of a head-on collision, the stop member 25 interacts with a counterpiece 27 formed on the subframe 7. During normal operating mode, the stop member 25 of the two-point link 9 is removed from and not in contact with the body-side counterpiece 27 and the longitudinal link 11, i.e. distanced by a clearance f from the body-side counterpiece 27 and the longitudinal link 11. This applies, when the front wheel 1 is not turned as well as when the front wheel 1 is turned, as shown in FIG. 2.

Thus, the stop member 25 is idle in normal operating mode and is activated only in the event of a collision, as will now be described with reference to FIGS. 3 to 5, depicting the two links 9, 11 in the lower link plane by way of a greatly simplified analogous model. FIG. 3 shows the initial position, i.e. during normal operating mode, in which the wheel carrier 3 is not turned. Thus, the stop member 25 is distanced by the clearance f from the body-side counterpiece 27. In the event of a head-on collision with slight lateral overlap, impact forces F act on the wheel carrier 3 cause the two-point link 9 to shift clockwise in a pivotal movement S, as shown in FIG. 4. At the same time, the stop member 25 of the two-point link 9 is urged into contact with the body-side counterpiece 27, thereby forming a body-side third mounting point 29. At the third mounting point 29, the stop member 25 and the counterpiece 27 form a blockage that opposes any further pivotal movement S of the two-point link 9. In the crash situation, shown in FIG. 4, the third mounting point 29 defines a further force path via which crash energy can be introduced into the vehicle body 7.

The body-side second mounting point 15 of the two-point link 9 is configured according to FIG. 5 such as to rupture during the course of the crash, so that the two-point link 9 is able to execute a pivotal movement S' about a vertical axis V, defined by the third mounting point 29. This pivotal movement S' is executed in FIG. 5 while the front wheel 1 shifts transversely in the vehicle transverse direction y outwards.

The third mounting point 29, formed as a result of a collision, is arranged according to FIG. 4 on the crash-distal side of the two-point link 9 and spaced by a distance a from the body-side second mounting point 15 of the two-point link 9. The large-area stop member 25 extends rearwardly from the two-point link 9 according to FIG. 4 by a predefined length l.

The longitudinal link 9 is arranged in FIGS. 1 to 5 on the crash-distal side of the two-point link 9, as viewed in the vehicle longitudinal direction x. This, the longitudinal link 11 acts as a compression strut which is exposed to compressive forces during a collision and via which crash energy can be introduced into the vehicle body 7.

FIGS. 6 to 8 illustrate a crash profile, encountered in a configuration in which the longitudinal link 11 is arranged on the crash-proximal side of the two-point link 9, with FIG. 6 depicting the normal operating mode of the vehicle. In the event of a crash, the wheel carrier 3 is exposed to impact forces F, causing the stop member 25 to move into contact with the body-side counterpiece 27, as shown in FIG. 7. The wheel-carrier-side mounting point 13 of the leading longitudinal link 11 is configured to rupture during the course of the crash to thereby decouple the longitudinal link 11 from the wheel carrier 3. This is shown in FIG. 8. As a result, a further pivotal movement S' about the third mounting point 29 is enabled, while the front wheel 1 undergoes a transverse shift d in the vehicle transverse direction y outwards.

Figure 9:
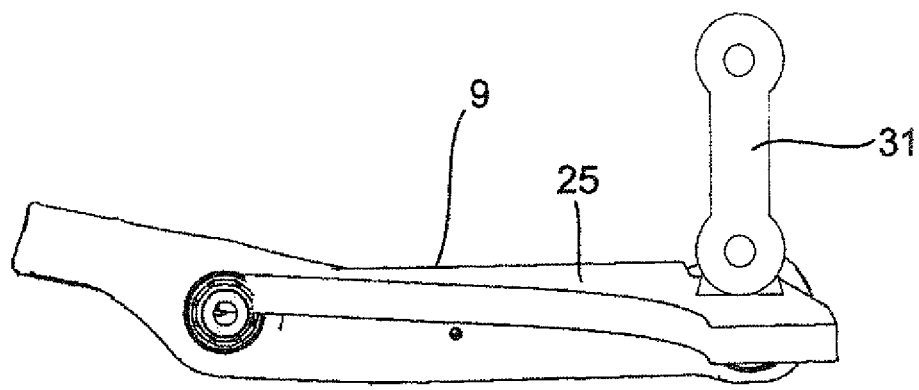
FIG. 9 shows a schematic illustration of a first variant of a longitudinal guide for a stop member of the two-point link.

Referring now to FIG. 9, there is shown a schematic illustration of a first variant of a longitudinal guide 31, by which the stop member 25 of the two-point link 9 is precisely guided in the lower link plane, as the two-point link 9 executes a pivotal movement S. The longitudinal guide 31 is realized here by way of example in the form of a coupling rod which is articulated at one end to the vehicle body 7 and at the other end to the stop member 25.

Figure 10:
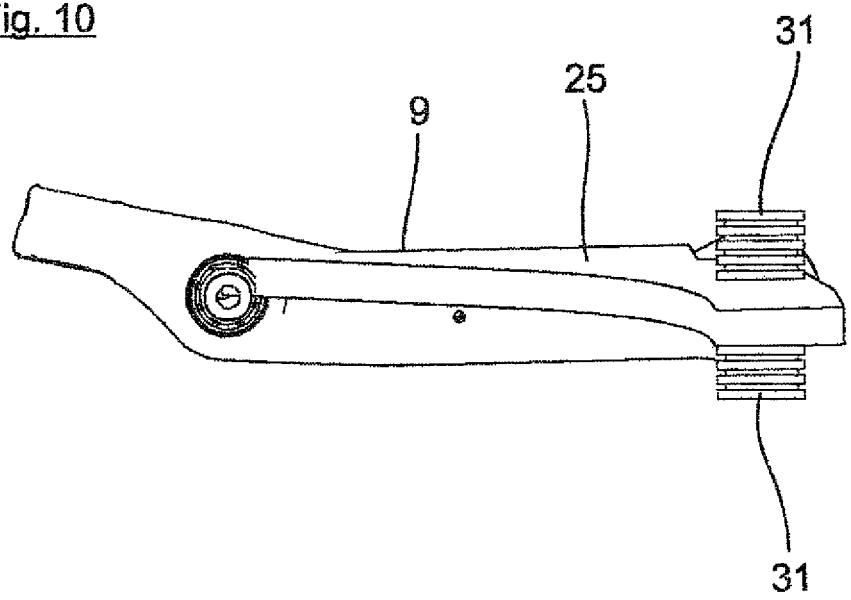
FIG. 10 shows a schematic illustration of a first variant of a longitudinal guide for a stop member of the two-point link.

FIG. 10 shows as a second variant, a longitudinal guide 31 in the form of a rubber-metal bearing which is provided between the vehicle body 7 and the stop member 25. The rubber-metal bearing is configured in terms of electrokinetics such as to have in vehicle vertical direction z a rigidity which is greater than a rigidity transversely thereto to thereby ensure a smooth pivotal movement by the two-point link 9 in the lower plane.

The elasticity of the longitudinal guide 31 and the added mass of the stop member 25 may further be used to provide a vibration system in vehicle vertical direction to thereby dampen or counteract vibrations of the axle, caused by excitations when traveling on a roadway. This can be realized in a simple way through adjustment of the elasticity of the longitudinal guide 31, since the elasticity in vehicle vertical direction z has in the event of a crash no significant impact on the function in the relevant stiffness area of the longitudinal guide 31.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A wheel suspension for a vehicle axle of a two-track vehicle, comprising:
a wheel carrier configured to support a vehicle wheel; and
a link assembly configured to articulate the wheel carrier to a vehicle body, said link assembly including at least one two-point link articulated on a side of the wheel carrier to the wheel carrier at a first mounting point and on a side of the vehicle body to the vehicle body at a second mounting point, with the at least one two-point link executing a pivotal movement in the event of a head-on collision to enable a collision-proximal vehicle wheel to move backwards, said at least one two-point link including a stop member to limit the pivotal movement in the event of the head-on collision, by impeding a body-side counterpiece, thereby forming a body-side third mounting point to block and counteract the pivotal movement of the at least one two-point link,
wherein the stop member of the at least one two-point link assumes an aerodynamic function when closing a space between the at least one two-point link and a longitudinal link.

2. The wheel suspension of claim 1, wherein during normal driving mode, the stop member of the at least one two-point link is spaced from the counterpiece by a clearance.

3. The wheel suspension of claim 1, wherein the third mounting point formed as a result of the collision is arranged, as viewed in a vehicle longitudinal direction, on a collision-distal side of the at least one two-point link.

4. The wheel suspension of claim 1, wherein the stop member is configured to extend from the at least one two-point link by a predefined length.

5. The wheel suspension of claim 1, wherein the third mounting point formed as a result of the collision is arranged, as viewed in a vehicle longitudinal direction, at a distance behind the second mounting point of the at least one two-point link.

6. The wheel suspension of claim 1, wherein the second mounting point of the at least one two-point link is dimensioned to rupture during the collision to enable the at least one two-point link to pivot about a vertical axis defined by the third mounting point and to execute a pivotal movement, thereby causing a transverse shift of the vehicle wheel in a vehicle transverse direction outwards.

7. The wheel suspension of claim 1, further comprising a body-side longitudinal guide to guide the stop member of the at least one two-point link, when the at least one two-point link pivots about the second mounting point.

8. The wheel suspension of claim 7, wherein the longitudinal guide is configured in the form of a coupling rod which is articulated to both the at least one two-point link and the vehicle body.

9. The wheel suspension of claim 7, wherein the longitudinal guide is configured in the form of a rubber bearing which connects the stop member of the at least one two-point link to the vehicle body.

10. The wheel suspension of claim 9, wherein the rubber bearing is a rubber-metal bearing.

11. The wheel suspension of claim 9, wherein the rubber bearing has in a vehicle vertical direction a rigidity which is greater than a rigidity of the rubber bearing in a direction transversely to the vehicle vertical direction to thereby realize a smooth pivotal movement of the at least one two-point link about the second mounting point.

12. The wheel suspension of claim 7, wherein the longitudinal guide has a rigidity sufficient to establish together with a mass of the stop member a vibration system to dampen and counteract vibrations of the vehicle axle in a vehicle vertical direction.

13. The wheel suspension of claim 1, wherein the link assembly is a five-link assembly of which at least one the two-point link is part of and represents a transverse link, which together with a longitudinal link of the link assembly is arranged in a lower link plane, said at least one two-point link assuming a load-bearing function to support a suspension spring and a vibration damper.

14. The wheel suspension of claim 1, wherein the link assembly is a five-link assembly of which the at least one two-point link is part of and represents a transverse link, which together with the longitudinal link is arranged in an upper link plane.

15. The wheel suspension of claim 1, wherein the longitudinal link is arranged in a vehicle longitudinal direction on a collision-proximal side of the at least one two-point link to assume a function as a tension strut which is subjected to a tensile force in the event of the collision.

16. The wheel suspension of claim 1, wherein the longitudinal link is arranged in a vehicle longitudinal direction on a collision-distal side of the at least one two-point link to assume a function as a compression strut which is subjected to a compressive force in the event of the collision.

17. The wheel suspension of claim 1, wherein the stop member of the at least one two-point link is disposed in a region between the at least one two-point link and the longitudinal link.

18. The wheel suspension of claim 1, wherein the stop member of the at least one two-point link is interleaved at least in part with the longitudinal link in a vehicle vertical direction.

19. The wheel suspension of claim 1, wherein the vehicle axle is a front axle.

* * * * *